(12) United States Patent
Fiehn

(10) Patent No.: US 7,249,845 B2
(45) Date of Patent: Jul. 31, 2007

(54) SPRING HINGE

(75) Inventor: Jörg Fiehn, Einsingen (DE)

(73) Assignee: Obe Ohnmacht & Baumgärtner GmbH & Co. KG (DE)

( * ) Notice: Subject to any disclaimer, the term of this patent is extended or adjusted under 35 U.S.C. 154(b) by 55 days.

(21) Appl. No.: 10/539,791

(22) PCT Filed: Dec. 11, 2003

(86) PCT No.: PCT/EP03/14049

§ 371 (c)(1),
(2), (4) Date: Aug. 5, 2005

(87) PCT Pub. No.: WO2004/057409

PCT Pub. Date: Jul. 8, 2004

(65) Prior Publication Data

US 2006/0126012 A1   Jun. 15, 2006

(30) Foreign Application Priority Data

Dec. 19, 2002   (DE) .................................. 102 61 765

(51) Int. Cl.
*G02C 5/22* (2006.01)
(52) U.S. Cl. .................... 351/153; 351/113; 16/228
(58) Field of Classification Search ............ 351/153, 351/113, 111, 114; 16/228, 237
See application file for complete search history.

(56) References Cited

U.S. PATENT DOCUMENTS

| 5,755,010 | A | 5/1998 | Lehnert | 16/228 |
| 6,336,251 | B1 | 1/2002 | Sartor | 16/228 |
| 6,353,965 | B1 | 3/2002 | Lo | 16/228 |

FOREIGN PATENT DOCUMENTS

| CN | 1179836 A | 4/1998 |
| DE | 9114917 | 3/1993 |
| DE | 195 11 167 | 10/1996 |
| DE | 19511167 | 10/1996 |
| DE | 198 56 117 A | 12/1998 |
| EP | 0652456 | 5/1995 |
| WO | WO 02/29476 | 4/2000 |
| WO | WO 02099521 | 12/2002 |
| WO | WO 03071338 | 8/2003 |

OTHER PUBLICATIONS

International Search Report PCT/EP03/14049 dated Feb. 11, 2004.

*Primary Examiner*—Hung Xuan Dang
(74) *Attorney, Agent, or Firm*—Ostrolenk, Faber, Gerb & Soffen, LLP

(57) ABSTRACT

A spring hinge for spectacles having a center piece and side pieces fitted pivotably thereto is proposed, having a spring element cooperating with said side pieces, a housing having a recess receiving the hinge element and the spring element, within which housing the hinge element is displaceably disposed, and having a locking body disposed in the recess, the locking body having a receiving region and the housing having a deformation region which is displaceable into the receiving region. The spring hinge is characterized in that the receiving region is configured such that the locking body, and hence the hinge element, is prevented from being twisted and from being pulled out of the recess.

14 Claims, 10 Drawing Sheets

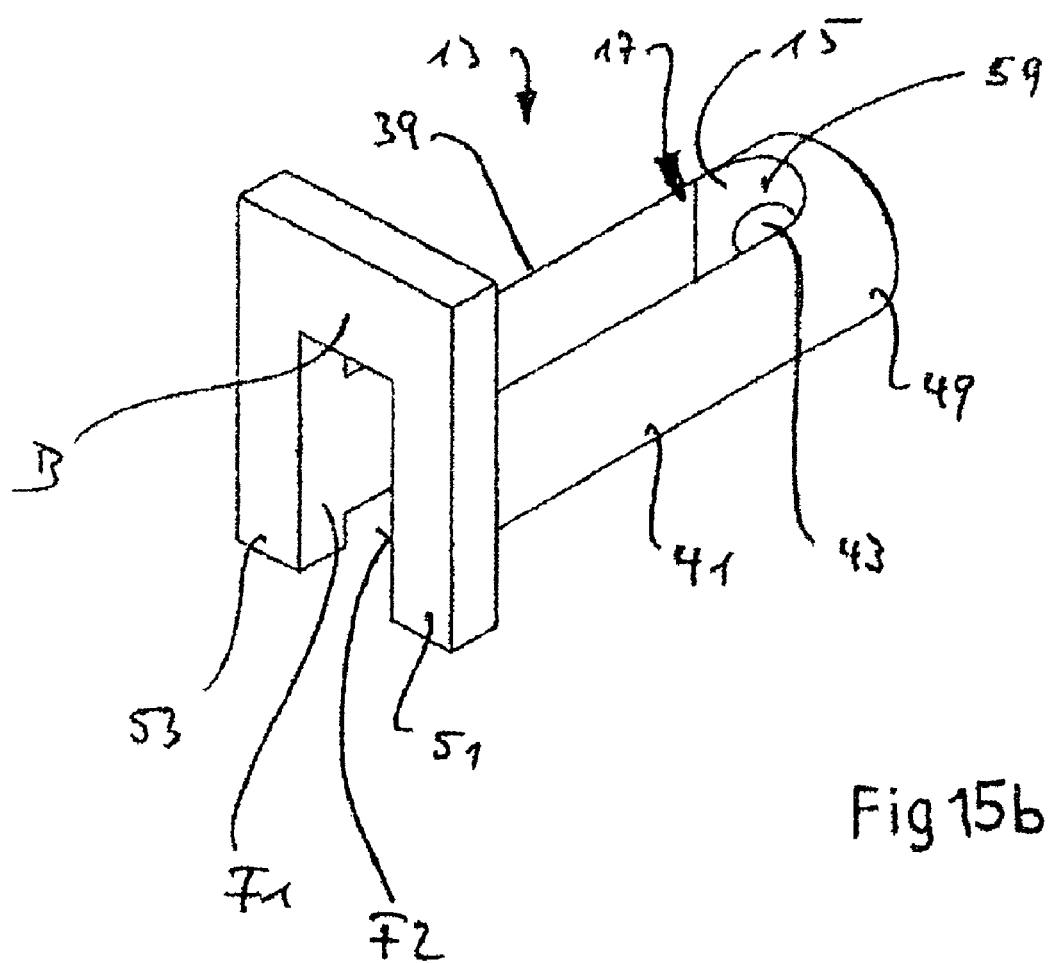

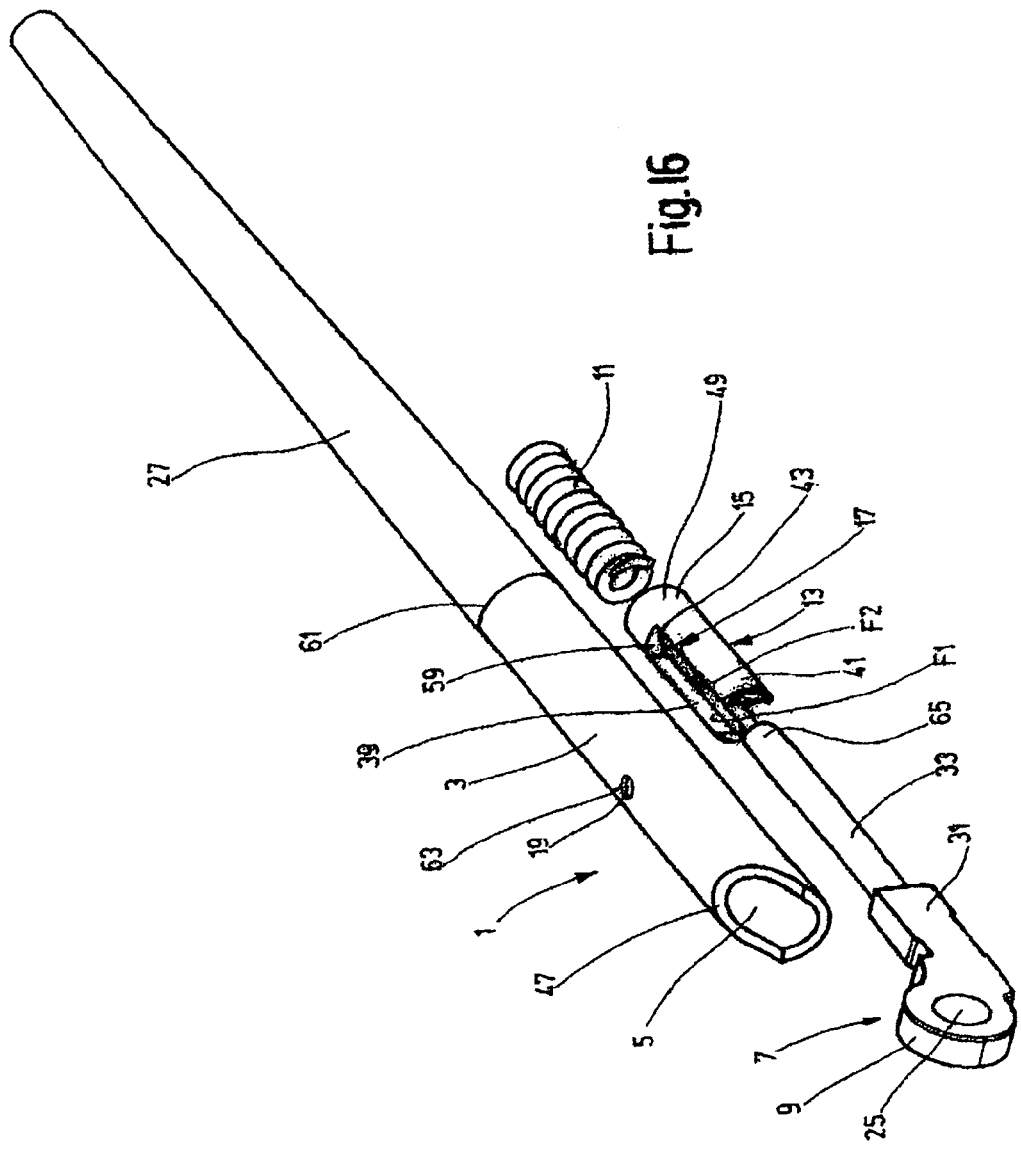

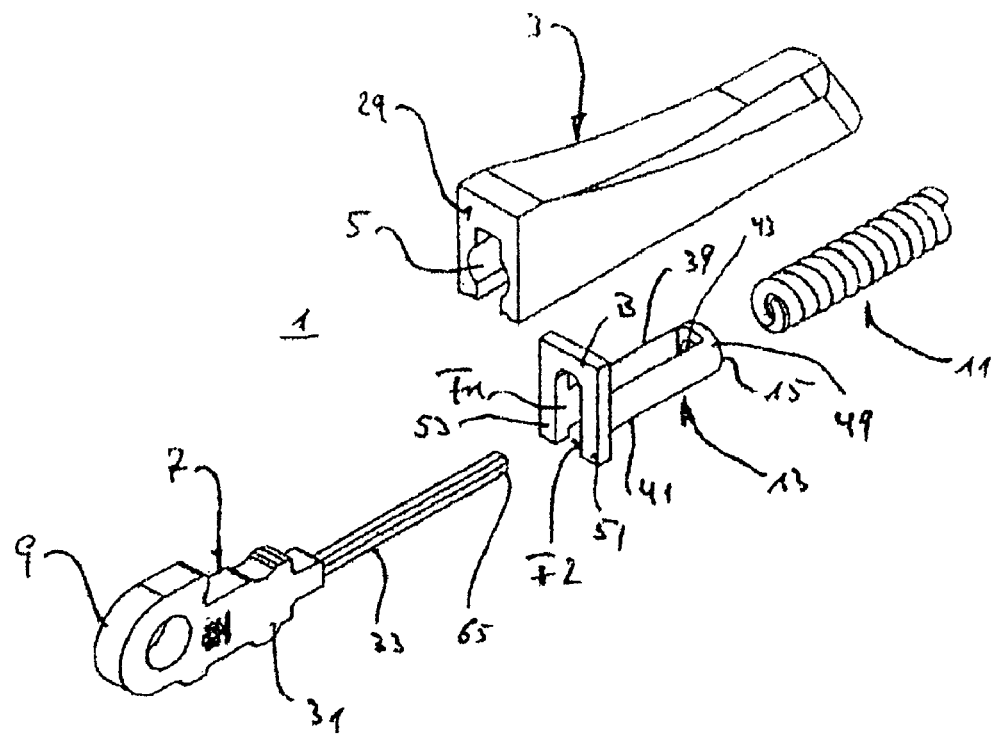

SPRING HINGE

CROSS REFERENCE TO RELATED APPLICATION

The present application is a 35 U.S.C. §371 national phase conversion of PCT/EP2003/014049 filed 11 Dec. 2003, which claims priority to German Application No. 102 61 765.1 filed on 19 Dec. 2002.

The PCT International Application was published in the German language.

The invention relates to a spring hinge for spectacles according to the preamble to claim 1.

Spring hinges of the type here under discussion are known. They serve to connect side pieces in an elastically resilient manner to a spectacle center piece comprising spectacle lenses. The spring hinges allow the side pieces to be fitted with a predefinable force onto the head of a wearer of the spectacles. The side pieces can also be pivoted out of a first functional setting, in which they bear against the center piece, into a second functional setting, in which they are disposed approximately at right angles to the center piece. If the side pieces are pivoted outward beyond the second functional setting, a spring element in the spring hinge is activated, which draws the side pieces back into the second functional setting so that the spectacles are securely held.

The spring element is accommodated inside a housing of the spring hinge, namely in a recess in the housing which also receives a hinge element held in the housing by a locking body.

It is known to fix the locking body inside the housing with a screw. In view of the miniaturization of spring hinges, the screws are getting increasingly small, so that they are becoming more and more intricate to handle. It has already been proposed to replace the screws with a bead by which the locking body is anchored inside the housing. The bead engages in an annular groove made in the basic element of the locking body. Although this produces an axial anchorage of the locking body, so that the hinge element cannot be pulled out from inside the housing, an additional protection is required against the hinge element being twisted in the housing. This leads to a relatively complex construction of the spring hinge.

The object of the invention is therefore to provide a spring hinge of the type stated in the introduction, which is of simple construction and does not have this drawback.

For the achievement of this object, a spring hinge is proposed which has the features stated in claim 1. The locking body of this spring hinge has a receiving region and the housing has a deformation region. The latter is displaceable into the receiving region of the locking body. The spring hinge is characterized in that the receiving region is configured such that the locking body is prevented from being twisted and pulled out of the recess. A double action is here therefore obtained, which allows a secure anchorage of the hinge element in the housing of the spring hinge without the need for any additional measures. Furthermore, the use of screws is rendered unnecessary by the deformation region, thereby substantially simplifying the assembly of the spring hinge.

An illustrative embodiment of the spring hinge is preferred which is characterized in that the deformation region is formed by at least one wall region of the housing which is plastically deformable by means of a tool. The parts of the spring hinge are thus able to be joined together particularly simply.

An illustrative embodiment of the spring hinge is additionally preferred which is characterized in that the wall region is closed. This has the advantage that no impurities can get inside the housing of the spring hinge, which impurities could lead to wearing and to functional defects.

An illustrative embodiment is additionally preferred which is characterized in that the deformation region comprises two plastically deformable wall regions of the housing. It is therefore possible to lend the spring hinge a variable shape and to adapt the number of deformation regions, for example, to different loading cases of the spring hinge.

In addition, an illustrative embodiment of the spring hinge is preferred which is characterized in that the plastically deformable wall region of the housing is thinner than the rest of its wall. The deformation forces are thus able to be adjusted and reduced to a minimum, with the result that a deformation of the rest of the spring hinge can virtually be precluded.

A further preferred illustrative embodiment of the spring hinge is characterized in that the receiving region in the locking body has at least one cavity, which can be made in the basic element of the locking body and in which the deformation region engages. This embodiment limits the range of motion in the displacement of the deformation region and thus offers the prospect of guaranteeing a defined assembly state. Furthermore, the deformation region cannot readily be pierced with the tool.

In addition, an illustrative embodiment of the spring hinge is preferred which is characterized in that the receiving region has at least one cutout, which can be made in the basic element of the locking body and which embraces the deformation region on at least three sides. The locking body can be realized differently, for example can have guide arms. It is possible to place the deformation region between the guide arms, which thus bear against the deformation region on two sides and hence prevent a rotation of the locking body within the housing of the spring hinge. A further region of the cutout bears against the deformation region and ensures that the locking body, and hence the hinge element, cannot be pulled out of the housing.

Further embodiments emerge from the remaining subclaims.

The invention is explained in greater detail below with reference to the drawings, in which:

FIG. 15b shows a further illustrative embodiment of a locking body in perspective view;

FIG. 16 shows an exploded representation of a spring hinge with an associated spectacle side piece;

FIG. 17 shows an exploded representation of a spring hinge with a locking body similar to that shown in FIG. 15b;

FIG. 18 shows the spring hinge according to FIG. 17 with a preassembled subassembly.

Figure 1:
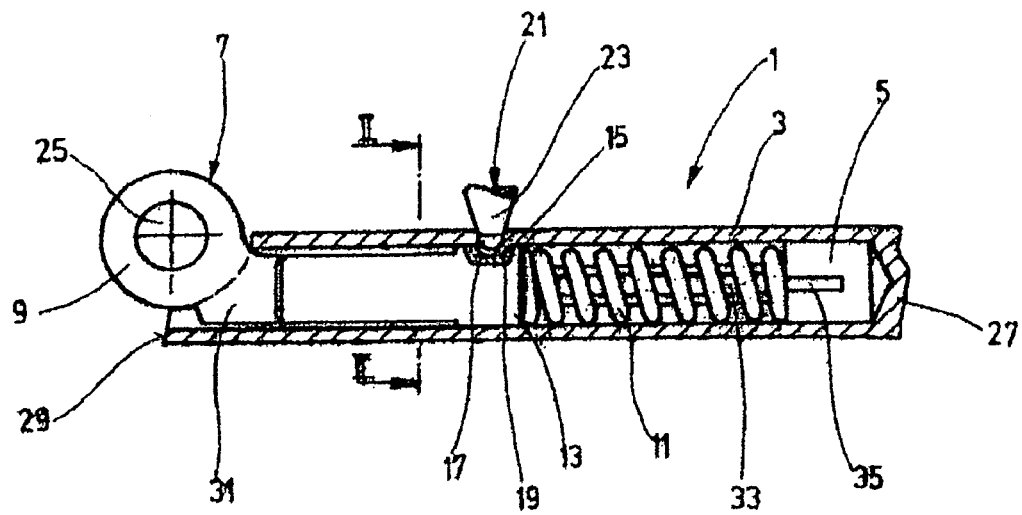
FIG. 1 shows a longitudinal section through an illustrative embodiment of a spring hinge.

FIG. 1 shows a longitudinal section through a spring hinge 1 having a housing 3 which encloses a recess 5. The latter accommodates a hinge element 7 having a gudgeon 9, a spring element 11, here configured as a helical spring, and a locking body 13, also referred to as a guide and closing piece. The latter is shown in partially cut representation, so that a receiving region 17 made in the basic element 15 of the locking body is visible, into which a deformation region 19 of the housing 3 is displaced. A tool 21 is also indicated here, which comprises a mandrel 23.

In the illustrative embodiment which is here represented, the receiving region 17 is realized as a cavity which is formed in the basic element 15 of the locking body 13 and in which the deformation region 19 engages. The locking body 13 is thus held in the recess 5 such that, on the one hand, it is axially secured and, on the other hand, a twisting of the locking body 13 relative to the housing 3 is precluded.

The basic construction of a spring hinge 1 of the type here under discussion is known, so that this is only explored briefly here: the spring hinge 1 can be connected by the gudgeon 9 to a hinge piece (not here represented), which, for its part, has at least one gudgeon. Spring hinges are known in which the hinge element 7 has two gudgeons disposed at a distance apart. The illustrative embodiment which is here represented is provided with a gudgeon 9, which cooperates, for example, with two mutually spaced gudgeons of the hinge piece, a screw reaching through the through hole 25 of the gudgeon 9 and corresponding through holes in the gudgeon(s) of the hinge piece.

In the representation which is here chosen, it is assumed that the housing 3 is part of a side piece 27, which is connected by the hinge piece (not here represented) to a spectacle center piece. The side piece 27 can be displaced relative to the center piece from a first functional setting, in which the side piece 27 bears against the center piece, into a second functional setting, in which the side piece 27 stands approximately perpendicular to the spectacle center piece. In this functional setting, the front side 29 of the housing 3, in this case, therefore, also of the spectacle side piece 27, bears against the hinge piece or the spectacle center piece. If the side piece is further pivoted in the clockwise direction, then the hinge element 7 is pulled, counter to the force of the spring element 11, out of the recess 5 of the housing 3, whereupon the spring element 11 is compressed. This leads to a restoring force, which displaces the side piece 27 back into its second functional setting and thus fits the spectacle side piece onto the head of a spectacle wearer with a pretensioning force.

The hinge element 7 has a guide region 31 adjoining the gudgeon 9, which guide region reaches through the locking body 13 and transforms into a pin 33, which here penetrates the spring element 11. On that end of the pin which lies opposite the guide region 31, a brace 35, configured as a flattening, is given for the spring element 11, which latter is supported with its right end against the brace 35 and with its left end against the locking body 13.

Figure 2:
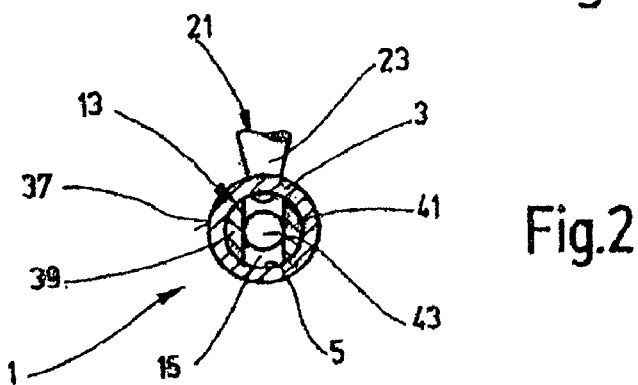
FIG. 2 shows a cross section along the line II-II through the spring hinge represented in FIG. 1, without hinge piece.

FIG. 2 shows a cross section through the housing 3 along the line II-II. Identical parts are provided with identical reference numerals, so that, in this respect, reference is made to the comments regarding FIG. 1.

The sectional representation according to FIG. 2 shows that the outer face 37 of the housing 3, and hence of the side piece 27, is of circular cylindrical configuration in this region. Accordingly, the recess 5 is also cylindrical. Two guide arms 39 and 41 are here visible, which are disposed at a distance apart and emanate from the basic element 15 of the locking body 13. The internal surfaces of the guide arms 39 and 41 are of plane configuration and are disposed at such a distance apart that the guide region 31 of the hinge element 7 (not depicted in the representation according to FIG. 2) locates here. FIG. 2 reveals that the basic element 15 of the locking body 13 has a through hole 43 disposed concentrically to the recess 5, through which the pin 33 of the hinge element 7 (not here represented) is guided. The locking body 13 thus guides the hinge element 7, on the one hand, in the region of the through hole 43, on the other hand, through the internal surfaces of the guide arms 39 and 41; therefore also referred to as the guide sleeve.

Also indicated in FIG. 2 is the tool 21, with whose mandrel 23 the housing 3, as explained above, is deformed.

Figure 3:
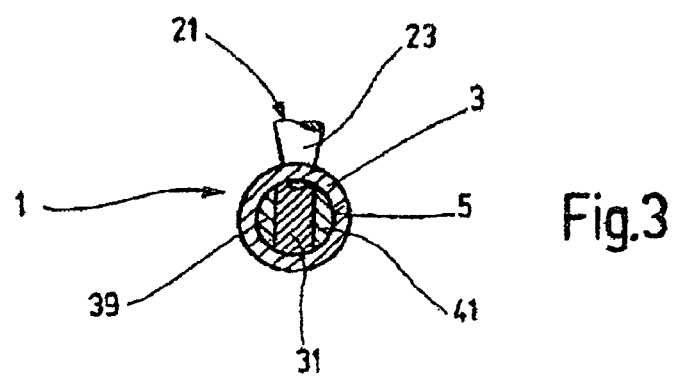
FIG. 3 shows a cross section through the spring hinge represented in FIG. 1, with hinge piece.

FIG. 3 shows the section depicted in FIG. 2, though with inserted hinge element 7. Identical parts are provided with identical reference numerals, so that reference is made to the description to FIG. 1 and 2. It is clearly apparent in this sectional representation that the spacing of the guide arms 39 and 41 is chosen such that the guide region 31 of the hinge element 7 is here guided in a two-dimensional plane, a rotation of the guide region 31, and hence of the hinge element 7, within the recess 5 being prevented by the anchorage of the locking body 13; therefore also referred to as the closing sleeve.

Figure 4:
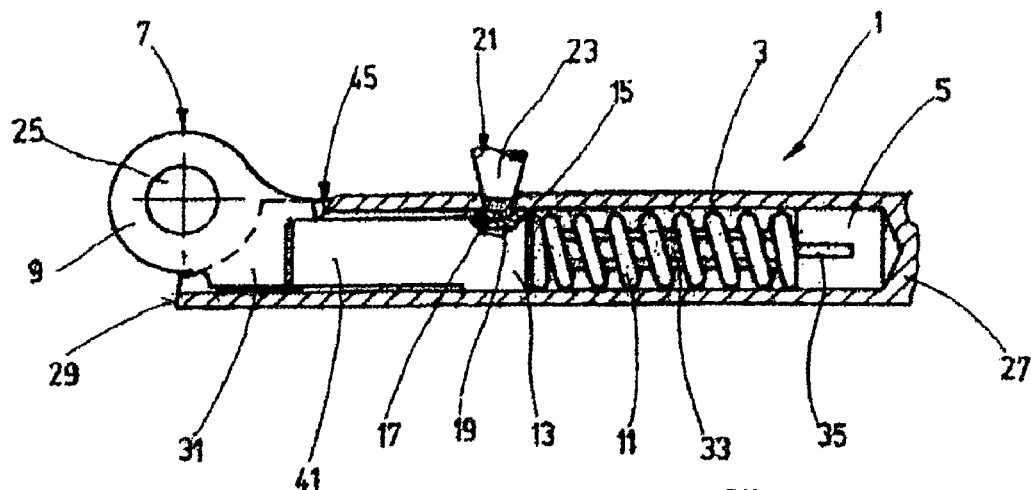
FIGS. 4 to 8 show longitudinal sections through further illustrative embodiments of a spring hinge.

FIG. 4 shows a further illustrative embodiment of a spring hinge 1. Identical parts are provided with identical reference numerals, so that reference is made to the description to the preceding figures and here only the differences relative to the illustrative embodiment according to FIG. 1 are explored.

The housing 3 has a slot 45, the width of which is matched to the thickness of the hinge element 7 such that the walls of the housing 3 which limit the slot 45 likewise help to guide the hinge element 7.

Figure 5:
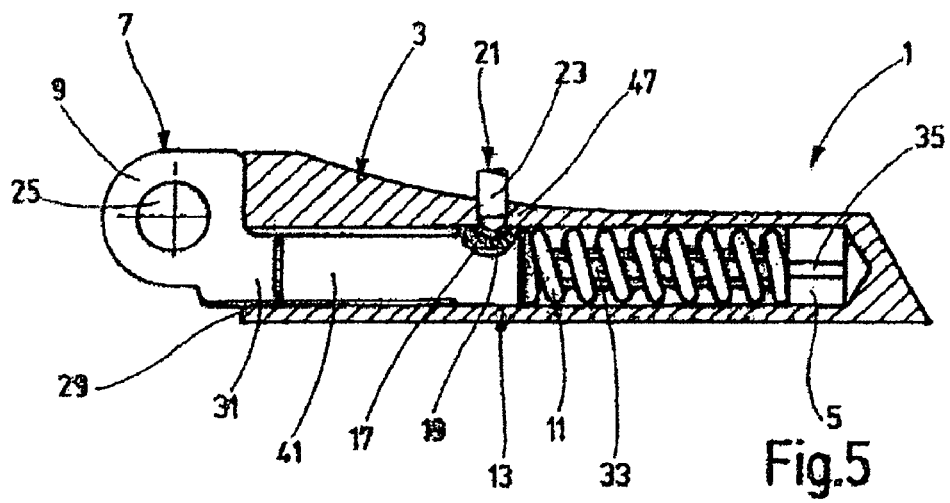

FIG. 5 shows a further illustrative embodiment of a spring hinge 1. Identical parts are provided with identical reference numerals, so that, in this respect, reference is made to the description to the preceding figures.

In the illustrative embodiments represented in FIGS. 1 and 4, the housing 3 of the spring hinge 1 is formed by the side piece 27 of a pair of spectacles. The illustrative embodiment of the spring hinge 1 which is represented in FIG. 5 is characterized in that the housing 3 is configured as a separate element, which is applied to a side piece 27 (not here represented). Standard methods such as soldering, welding, especially electric welding, and the like can herein be used.

In the illustrative embodiment which is here represented, it becomes particularly clear that the deformation region 19 is formed by a plastically deformable wall region of the housing 3 which is thinner than the rest of the wall 47 of the housing 3. The mandrel 23 of the tool 21 is here, therefore, in part cylindrically configured, while the mandrel 23, in the illustrative embodiments according to FIGS. 1 and 4, can have a conical outer contour.

In the spring hinges 1, too, according to FIGS. 1 and 4, the deformation region 19 is preferably likewise realized by a plastically deformable wall region which is thinner than the rest of the wall of the housing 3.

Common to the illustrative embodiments represented in FIGS. 1, 4 and 5 is the fact that the receiving region 17 in the locking body 13 is disposed in an annular region of the basic element 15. From this, as explained, two guide arms 39 and 41 can emanate, which serve to guide the hinge element 7, especially the guide region 31 thereof. In the illustrative embodiment which is here represented, the hinge element is guided exclusively by the locking body 13. The fact that the receiving region 17 is realized by a defined cavity, which is of conical configuration, for example, means that the locking body 13 is secured by the deformation region 19, reaching into the receiving region 17, both against twisting relative to the housing 3 and against axial displacement. The hinge element 7 is thus also prevented from being pulled out of the recess 5 of the housing 3.

Figure 6:
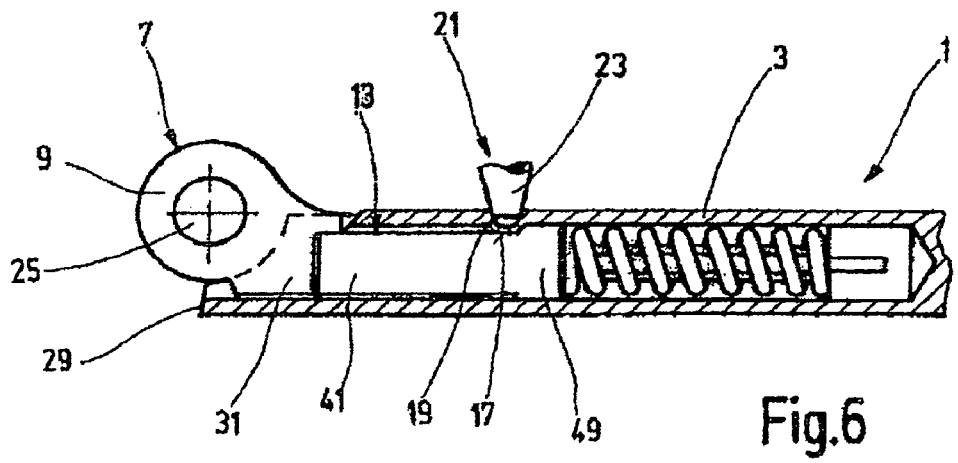

FIG. 6 shows a modified illustrative embodiment of a spring hinge 1, which substantially corresponds to that represented in FIG. 4. Identical parts are provided with identical reference numerals, so that reference is made to the description to the preceding figures.

The critical difference to the illustrative embodiment according to FIG. 4, but also relative to the illustrative embodiment represented in FIG. 1, is that the deformation region 19 of the housing 3 does not engage in the annular region 49 of the basic element 15 of the locking body 13, but rather in the cutout or free space provided between the guide arms 39 and 41, which free space—viewed in the longitudinal direction—is limited by the two internal surfaces of the guide arms 39, 41, and in FIG. 6, to the right, by the annular region 49. Since the deformation region 19 juts into the recess 5 and the locking body 13 is disposed inside the recess 5 to the right of the deformation region, the locking body 13, in the presence of a tensile force acting upon the hinge element 7, can no longer be pulled out of the recess 5. A twisting of the locking body 13 is prevented by the two guide arms 39 and 41.

Finally, in the illustrative embodiment, too, according to FIG. 6, the locking body 13 is therefore secured against twisting and against being pulled out of the recess 5.

Figure 7:
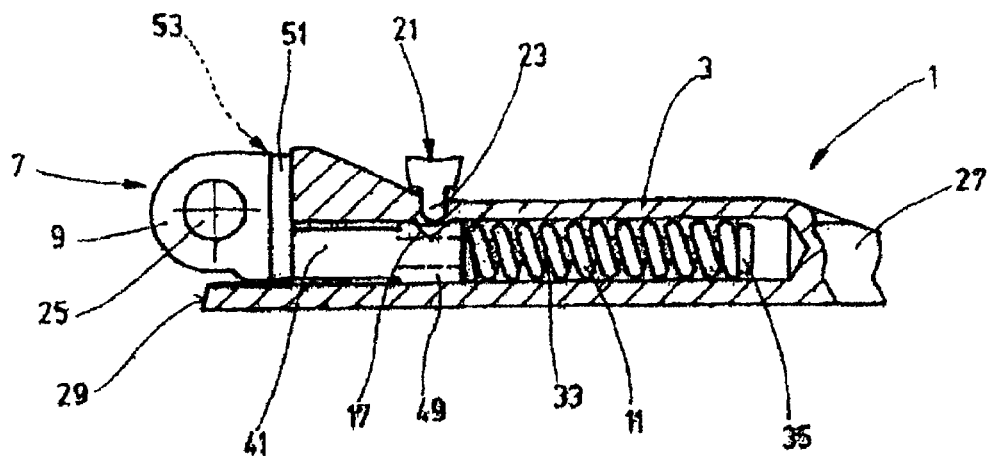

FIG. 7 shows a further illustrative embodiment of a spring hinge 1. Identical parts are provided with identical reference numerals, so that reference is made to the description to the preceding figures.

The difference relative to the spring hinges already described consists in the fact that the locking body 13 has at least one, here two running surfaces 51 disposed to the right and left of the hinge element 7, only the front one of which is represented here. The other running face 53 lies behind the hinge element 7 and is thus concealed.

In the illustrative embodiment represented in FIG. 7, the deformation region 19 of the housing 3 engages in a receiving region 17 of the locking body 13, which, in turn, is disposed in the annular region 49 of the basic element 15. This embodiment is therefore comparable with those which have been explained with reference to FIGS. 1 to 5. In the illustrative embodiment which is here represented, the brace 35 for the spring element 11 is not realized by a flattening of the end of the pin 33, but by a compression.

Figure 8:
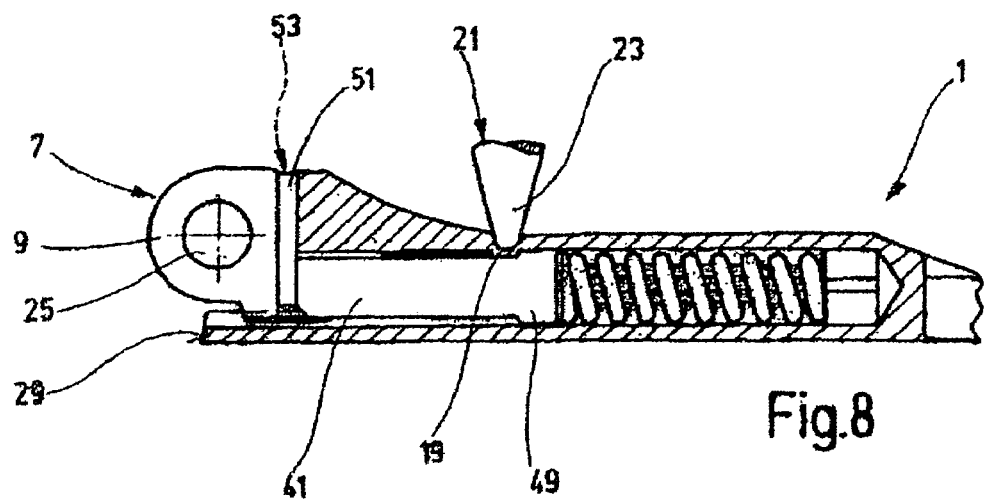

Contrastingly, in the illustrative embodiment of the spring hinge 1 represented in FIG. 8, the deformation region 19 is disposed, in turn, in the immediate vicinity of the annular region 49, to be precise between the guide arms 31 and 41, whereof the front guide arm 41 is here visible. On the guide arms, running surfaces 51 and 53 are, in turn, provided, which are disposed to the right and left of the hinge element 7.

Regarding the running surfaces, which in essence are known, the following should be noted: upon a swivel motion of the side piece 27, which here forms the housing 3 of the spring hinges 1 represented in FIGS. 7 and 8, cams configured on the hinge piece connected to the center piece of the spectacles, run along the front side of the housing, which leads to a wearing of the housing 3 and of the cams. This applies, in particular, where, for the hinge piece and for the housing 3, materials are chosen which tend toward cold-welding, as is the case, for example, with titanium. Such wearing phenomena can be prevented if between the two elements, i.e. between the cams on the hinge piece and the front side of the housing 3, namely the running surfaces 51 and 53, a material is introduced which has good sliding characteristics relative to the cams on the hinge piece, in this case, therefore, relative to titanium. The cams of the hinge piece then run down on these running surfaces.

A comparison of FIGS. 7 and 8 shows that the guide arms 39 and 41 can be configured in varying lengths to enable different lengths of the spring hinge 1 to be realized.

In the illustrative embodiments represented in FIGS. 1 to 8, the deformation region 19 has been provided at the top of the housing 3. It is herein assumed that the spring hinges 1 here respectively have a single deformation region 19, which cooperates with a corresponding receiving region 17 in the locking body 13.

Figure 9:
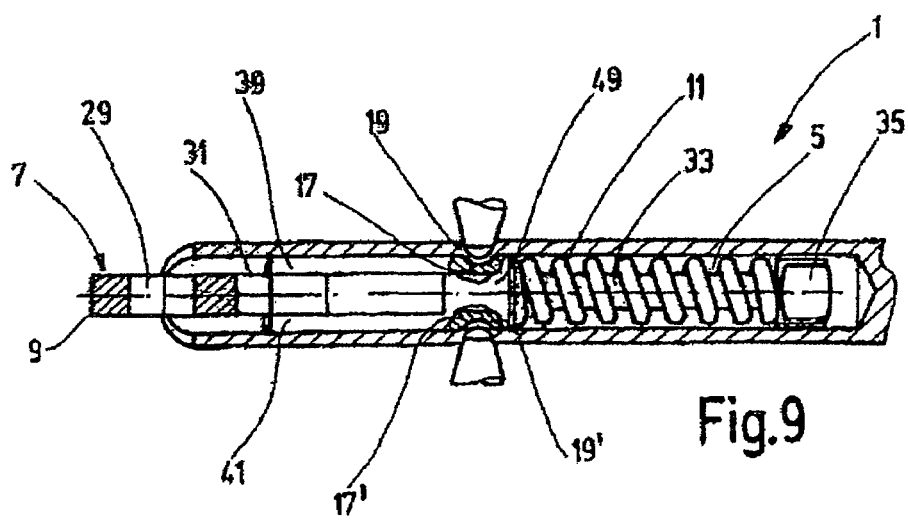
FIG. 9 shows a longitudinal section, drawn along a horizontal plane, through a further illustrative embodiment of a spring hinge.

FIG. 9 shows a further illustrative embodiment of a spring hinge in longitudinal section, the sectional plane being rotated by 90° relative to that chosen in FIGS. 1, 4, 5, 6, 7 and 8. Identical parts are provided with identical reference numerals, so that, in this respect, reference is made to the description to the preceding figures.

The sole difference is here that the housing 3 has two deformation regions 19 and 19', which are provided on the right and left on the housing 3 and cooperate with corresponding receiving regions 17 and 17' in the basic element 15 of the locking body 13. The receiving regions 17, 17' are disposed in the annular region 49 of the locking body 13, which here, in turn, can have two guide arms 39 and 41, which cooperate with the guide region 31 of the hinge element 7.

Figure 10:
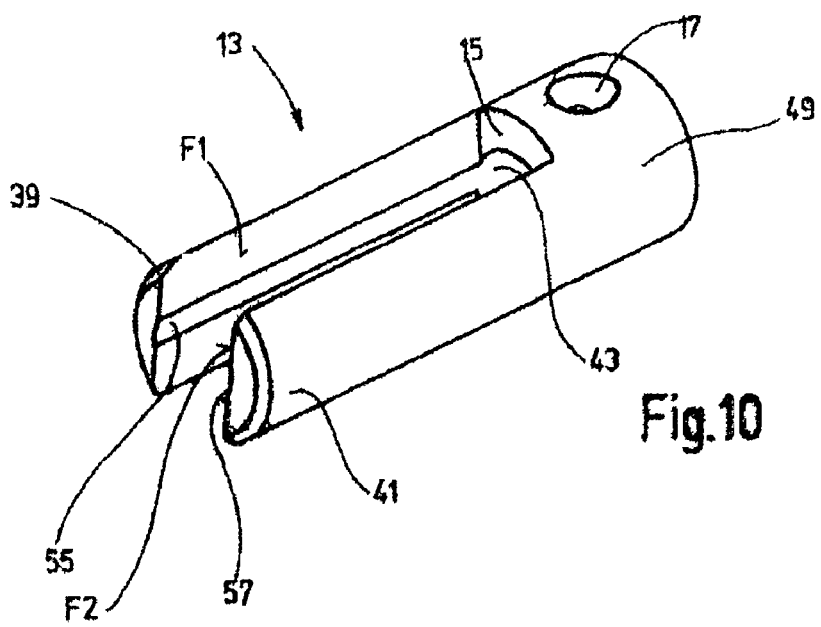
FIGS. 10 and 11 show perspective views of different locking bodies.

FIG. 10 shows a locking body 13 in perspective view. On the one hand, the annular region 49 of the basic element 15 and, on the other hand, the guide arms 39 and 41 having the internal surfaces F1 and F2 acting as guide surfaces, can here be clearly identified. In the annular region 49, the receiving region 17 is provided, which is here configured as a cavity and displays a substantially conical contour.

The through bore 43 reaching through the annular region 49 has a diameter which is somewhat greater than the distance between the first guide arm 39 and the second guide arm 41. This produces, on the internal surface of the guide arms, a respective channel 55 and 57.

Figure 11:
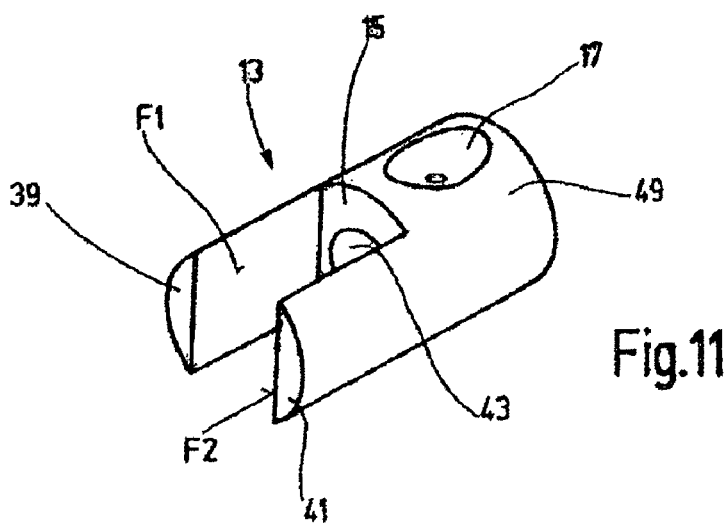

FIG. 11 shows an illustrative embodiment of a locking body 13, the guide arms 39 and 41 of which are configured shorter than is the case in the illustrative embodiment according to FIG. 10. The diameter of the through hole. 43 is smaller than the distance between the guide arms 39, 41, so that their inner sides form plane guide surfaces, which cooperate with the guide region 31 of a hinge element 7 (not here represented).

Here too, the receiving region 17 is clearly discernible, which is disposed in the annular region 49 of the basic element 13 of the hinge element 13 and has a frustoconical contour.

Figure 12:
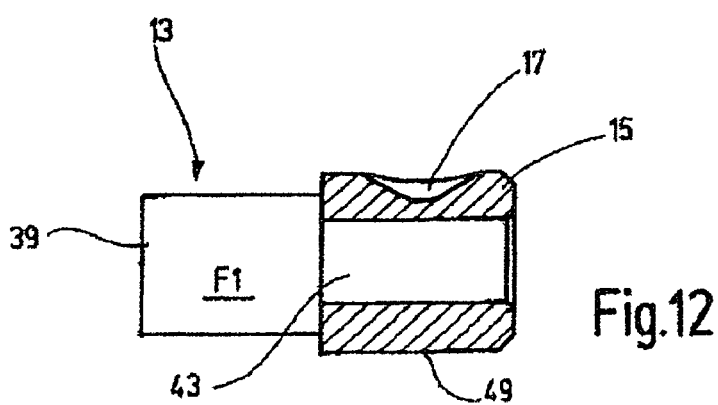
FIG. 12 shows a longitudinal section through the locking body depicted in figure 11.

FIG. 12 shows a longitudinal section through the illustrative embodiment of the locking body 13 represented in FIG. 11. The internal surface of the guide arm 39 is here clearly visible, as is the frustoconical contour of the receiving region 17, which latter is disposed in the annular region 49 of the basic element 15 of the locking body 13. Just like the mutually facing internal surfaces of the guide arms 39 and 41, the internal surface of the through hole 43 serves the guidance of the hinge element 7, the pin 33 of the hinge element 7 being disposed and guided in the region of the through hole 43.

Figure 13A:
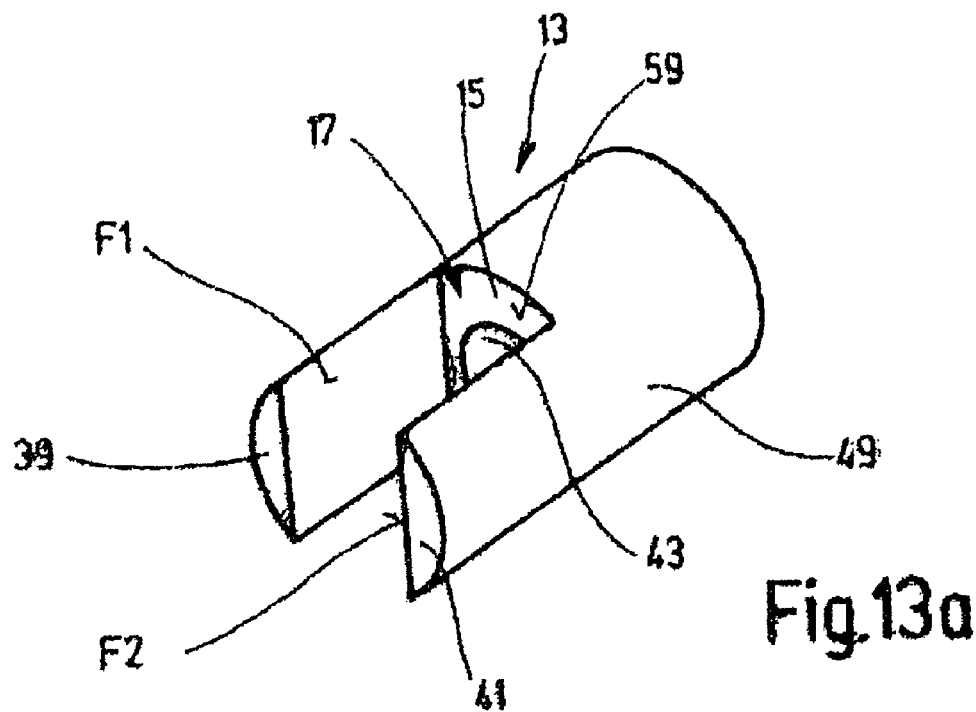
FIGS. 13a and 13b show perspective views of further illustrative embodiments of a locking body.

FIG. 13a shows a modified illustrative embodiment of a locking body 13. Identical parts are provided with identical reference numerals, so that reference is made to the description to the figures above. The illustrative embodiment represented in FIG. 13a is characterized in that, in the annular region 49, no receiving region 17 is provided. This is instead formed by the free space between the guide arms 39 and 41, which bear on the right and left against a deformation region 19 (not here represented) and thus prevent a twisting of the locking body 13 in a recess 5 of a housing 3. The locking body 13 is prevented from being pulled out of a recess 5 of a spring hinge 1 by the front side 59 of the annular region 49 of the basic element 13, which front side faces the observer.

The locking body 13 represented in FIG. 13a has, therefore, a receiving region 17 which is situated between the guide arms 39 and 41 and is formed by the cutout between the guide arms 39 and 41. This cutout embraces a deformation region 19 of a spring hinge 1 on three sides, namely with the guide arms 39 and 41 and with the front side 59 of the annular region 49 of the locking body 13.

Figure 13B:
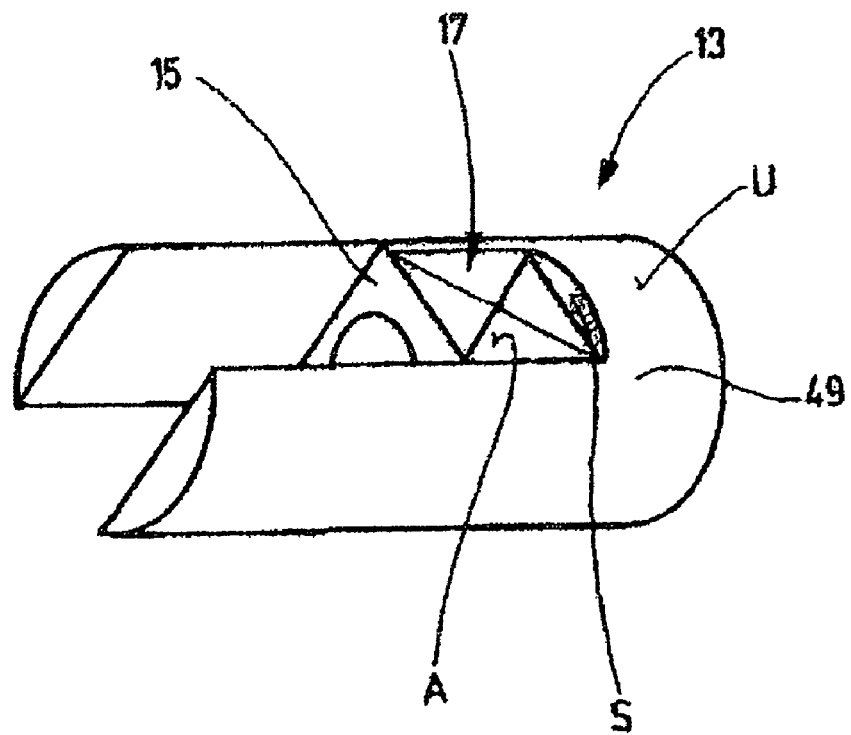

FIG. 13b shows a modified illustrative embodiment of a locking body 13. Identical parts are provided with identical reference numerals, so that, in this respect, reference is made to the description to the preceding figures, especially to FIG. 13a.

The basic element 15 of the locking body 13 has two guide arms 39 and 41 with an intervening receiving region 17, which is here realized as a flattening A of a part of the annular region 49. This flattening is situated between the two guide arms 39 and 41 and transforms, via a step S, into the peripheral surface U of the annular region 49.

A deformation region 19 locates upon the flattening A, so that the locking body 13 can no longer be twisted within the recess 5 of a housing 3. The deformation region 19 also butts against the step S, so that the locking body 13 can no longer be pulled out of the recess 5.

The locking body 13 is therefore shown to have a receiving region 17, which, in cooperation with a deformation region 19, leads to the locking body 13 being secured both against rotation and against an axial displacement within the housing 3 of a spring hinge 1.

In the illustrative embodiment represented in FIG. 13b, the receiving region 17 can be created relatively simply, namely by the removal of material from the peripheral surface U of the basic element 15 of the locking body 13, for example through a milling or grinding process. Of course, the flattening A can also be taken into consideration in a forming process during the manufacture of the locking body 13 and can be formed into the basic element 15.

Figure 14:
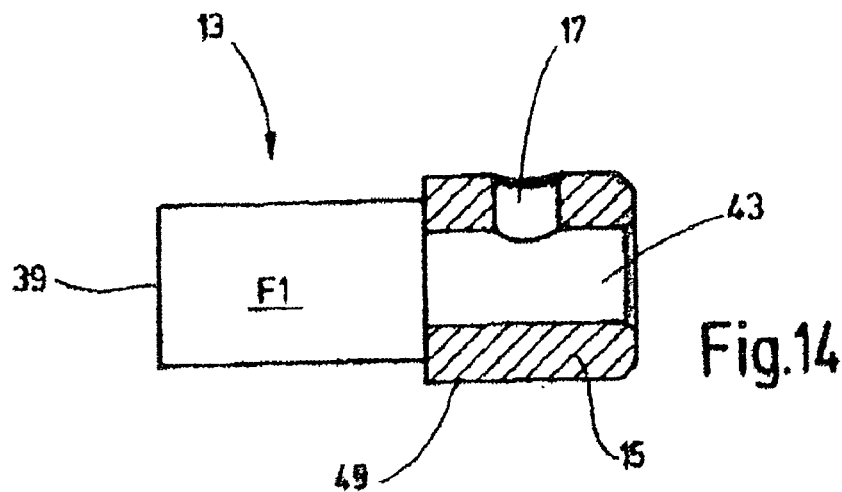
FIG. 14 shows a longitudinal section through a further illustrative embodiment of a locking body.

FIG. 14 shows a modified illustrative embodiment of a locking body 13 in longitudinal section. Here, a guide arm 39, the annular region 49 of the basic element 15 of the locking body 13 and the through hole 43 which penetrates this region are clearly discernible. The receiving region 17 is here realized by a bore, which penetrates the wall of the annular region 49 and thus ensures that a deformation region 19 can engage here. This embodiment of the receiving region 17 also has the effect that, when a deformation region 19 engages here, the locking body 13 is secured against twisting within a recess 5 of a housing 3 of a spring hinge 1, and against the locking body 13, and hence a hinge element 7, being pulled out from the recess 5 of the spring hinge 1.

Figure 15A:
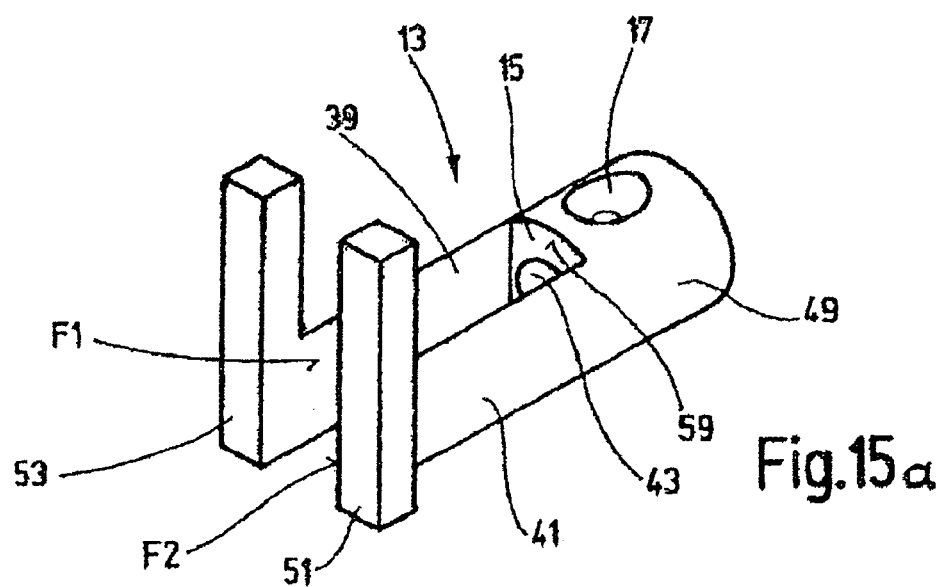
FIG. 15a shows a perspective view of a further illustrative embodiment of a locking body.

FIG. 15a shows in perspective representation a modified illustrative embodiment of a locking body 13, which is configured similar to that represented in FIG. 11. Identical parts are provided with identical reference numerals, so that reference is made to the preceding figures and their description.

The illustrative embodiment represented in FIG. 15a is characterized by running surfaces 51 and 53, which are formed by material strips disposed on those ends of the guide arms 39 and 41 which are facing away from the annular region 49. Preferably, the locking body 13 is configured in one piece. It is also conceivable, however, to fasten the running surfaces 51 and 53 in a suitable manner to the ends of the guide arms 39 and 41, for example, to weld or solder them in place. In the illustrative embodiment represented in FIG. 15a, a receiving region 17 is realized in the annular region 49. It is also conceivable, however, to choose the recess situated between the guide arms 39 and 41 as the receiving region 17, as has been explained with reference to FIG. 13.

Finally, it is also possible, in the illustrative embodiment represented in FIG. 15a, to provide two receiving regions, disposed on the sides, as has been explained with reference to FIG. 9. The same also applies, of course, to the other locking bodies 13 represented in FIGS. 10 to 14.

FIG. 15b shows in perspective view a further illustrative embodiment of a locking body, which is modified relative to that in FIG. 15a. Identical parts are provided with identical reference numerals, so that, in this respect, reference is made to preceding figure.

The locking body 13 represented in FIG. 15b has two guide arms 39 and 41, which emanate from an annular region 49 and, at their ends facing away from the annular region 49, are provided with running surfaces 51 and 53. These are mutually connected in their upper region by a material bridge B, so that, ultimately, a U-shaped front side is formed, which closes off a housing 3 into which the locking body 13 is fitted. In addition, the material bridge B helps to stabilize the locking body 13, since those ends of the guide arms 39 and 41 which are facing away from the annular region 49 of the basic element 15 are mutually connected.

On the inner side of the guide arms 39 and 41 can be recognized internal surfaces F1 and F2 acting as guide surfaces, which have already been explained in detail above and guide the hinge element 7 introduced between the guide arms 39 and 41.

In the illustrative embodiment of the locking body 13 which is here represented, the annular region 49 has no receiving region. Instead, it is here too envisaged that the deformation region 19 (not here represented) of the housing 3 locates between the guide arms 39 and 41. A twisting of the locking body 13 within the housing 3 (not here represented) is thus precluded. Moreover, the deformation region 19 is disposed between the guide arms 39 and 41 such that it bears against the front side 59 of the annular region 49. An axial displacement of the locking body 13 is also thereby prevented.

FIG. 15b further shows the through hole 43, which penetrates the annular region 49 of the basic element 15 and the wall of which serves to guide the pin 33 of the hinge element 7 when the latter is inserted into the locking body 13.

FIG. 16 shows, in exploded representation, a spring housing 1 having a hinge element 7, a locking body 13, and having a spring element 11, which here, in turn, is configured as a helical spring.

The spring hinge 1 here transforms into a side piece 27 of a pair of spectacles. A line 61 is used to indicate that the spring hinge 1 can be fitted to the side piece 27. It is also possible, however, to fit the recess 5 of the spring hinge 1 directly into the end of a side piece 27, so that, between the spring hinge 1 or its housing 3 and the rest of the side piece 27 no transition is visible, so that the line 61 can be deleted.

On the top side of the housing a depression 63 is visible, in the region of which the thickness of the wall 47 is reduced and a deformation region 19 is configured. If the wall 47 is suitably thin, the depression 63 can be dispensed with. It is useful, however, for the reason that, when completing the housing, it is easy to see where the deformation region 19 is disposed and where it is necessary to apply the tool 21 in order to anchor the locking body 13 securely in the recess 5 of the housing 3 of the spring hinge 1.

The hinge element 7 has a gudgeon 9, which is passed through by a through hole 25, and also a guide region 31, which locates in the free space of the locking body 13, which free space is provided between the guide arms 39 and 41. The basic element 15 of the locking body 13 is reached through by the pin 33 of the hinge element 7. Said pin juts therefore through the through hole 43 in the annular region 49 of the locking body 13 and extends through the spring element 11. That end 65 of the pin 33 which is facing away from the gudgeon 9 is deformed once the locking body 13 and the spring element 11 have been slipped on, so that a brace 35, realized, for example, by a flattening, is formed, which brace has been explained with reference to the preceding figures and serves to clamp the spring element 11 in place between the locking body 13 and the brace 35.

The assembly unit consisting of hinge element 7, locking body 13 and spring element 11 can also be slid, following preassembly, into the recess 5. The deformation region 19 is then deformed such that it engages in the recess 5 in the housing 3 and here, for example, is displaced into the receiving region 17 which is situated between the guide arms 39 and 41 and which is limited to the right by the annular region 49 or the front side 59 thereof.

Through the displacement of the deformation region 19 into the receiving region 17, the locking body 13 is anchored inside the spring hinge 1 and is secured against twisting and against being pulled out of the recess 5, whereby the hinge element 7 is also prevented from being possibly pulled out of the recess.

With reference to FIG. 16, it has been explained that a depression 63 can be made in the wall 47. It is also conceivable, however, to make in the wall 47 a through hole, the rim of which is displaced into the receiving region 17 and thus forms the deformation region 19. An attempt can be made to form the rim of the hole, and hence the deformation region 19, tight against the receiving region 17. It cannot be wholly precluded, however, that in such a configuration of the deformation region 19, impurities may manage to get inside the housing 3. It is therefore preferable if the deformation region 19, as described above, is realized by a closed wall region, which is plastically deformable and the wall thickness of which is preferably thinner than the wall 47 of the housing 3. The reduced wall thickness can serve to ensure that the forces for the displacement of the deformation region 19 into the receiving region 17 do not get too large. A deformation of the spring hinge 1 as a whole is thus able to be prevented.

In the illustrative embodiment of the spring hinge 1 which is represented in FIG. 16, a locking body 13 as explained with reference to FIG. 10 or 11, or as represented in FIG. 15, can be used. It is therefore possible to provide the locking body 13 with at least one recess, which forms the receiving region 17, the recess being able to be realized by a cavity or by a bore. As explained with reference to FIG. 9, two deformation regions and receiving regions, disposed on the side of the spring hinge 1, can also be provided in this case. Finally, it is possible to provide the locking body 13 with running surfaces 51 and 53, which has been explained in greater detail with reference to FIGS. 7 and 8, and 15.

FIG. 17 shows in exploded representation a spring hinge having a housing 3, which can be configured separate from a spectacle side piece and can be applied thereto. Parts which have already been explained with reference to the preceding figures are provided with identical reference numerals, so that, in this respect, reference is made to the preceding figures so as to avoid repetition.

In the perspective view according to FIG. 17, the hinge element 7, the locking body 13, as has been explained with reference to FIG. 15b, and a spring element 11 are arranged in mutual alignment. Parallel thereto and further to the rear lies the housing 3.

The guide region 31 of the hinge element 7, which cooperates with the guide surfaces F1 and F2 of the locking body 13, is clearly discernible. The pin 33 of the hinge element 7 reaches through the through hole 43 in the basic element 15 of the locking body 13 and penetrates the spring element 11 configured as a helical spring. In order to secure this on the pin 33, the end 65 of the pin 33 is deformed, for example pressed flat, so as to form a brace 35 for the spring element 11.

The hinge element 7 is then—as in the other illustrative embodiments—slid jointly with the locking body 13 and the spring element 11, at least in part, into the recess 5 of the housing 3; the gudgeon 9 of the hinge element 7 remains outside the housing 3.

In the fitting the preassemblable subassembly consisting of hinge element 7, locking body 13 and spring element 11, this is slid into the housing 3 to the point where the running surfaces 51 and 53, and the material bridge B, rest upon the front side 29 of the housing 3.

FIG. 18 shows a spring hinge 1 in exploded representation, though here the preassemblable subassembly consisting of hinge element 7, locking body 13 and spring element 11 are already assembled. The end 65 of the pin 33, which is here not visible, is compressed in the longitudinal direction so as to form the brace 35 and secure the spring element.

Separate from the preassemblable subassembly, the housing 3 of the spring hinge 1 is represented.

Figure 19:
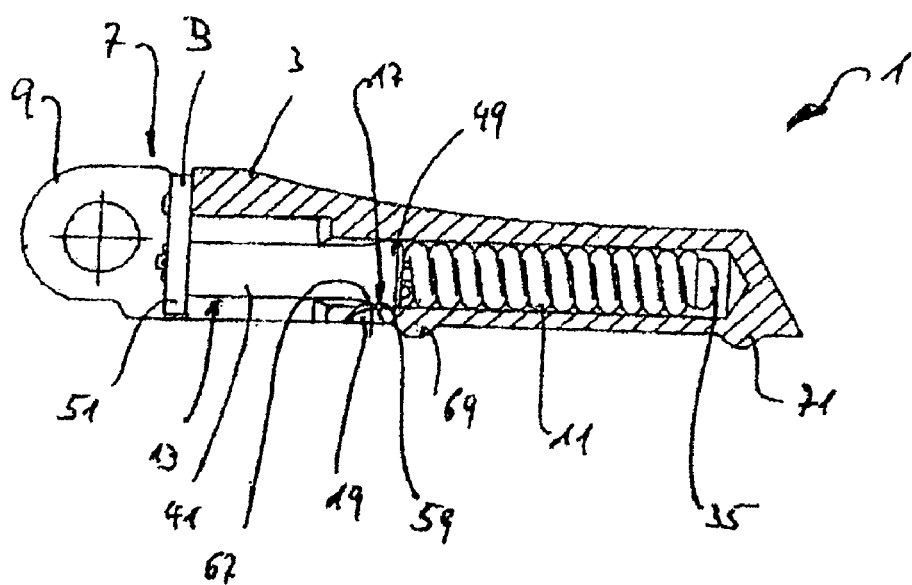
FIG. 19 shows a longitudinal section through the assembled spring hinge.

FIG. 19 shows the spring hinge represented in FIGS. 17 and 18 in the assembled state, the housing 3 being represented in longitudinal section.

It can clearly be discerned that the hinge element 7 is inserted partially into the recess 5 in the housing 3, namely to the point where the gudgeon 9 protrudes. The locking body 13 is held in locking arrangement inside the housing 3 such that it, on the one hand, is fixed in the axial direction and, on the other hand, cannot be twisted within the housing 3. For this purpose, a deformation region 19 of the housing 3, which is here disposed, by way of example, on the bottom side thereof, is forced inside the recess 5 such that it bears against the front side 59 of the locking body 3. The deformation region 19 reaches up to the guide arms 39 and 41, whereof the front guide arm 41 is here visible. A twisting of the locking body 13 is prevented by the fact that the lower edges of the guide arms 39 and 41 butt against the deformation region 19.

In the illustrative embodiment which is here represented, the housing 3 is provided on its bottom side with weld bosses 69 and 71, which serve to fasten the housing 3 onto a spectacle side piece (not here represented) by electric welding. Naturally, other fastening options, such as soldering or the like, are also possible.

The hinge element 7, where the deformation region 19 is provided, is provided with a flattened region 67 so as to ensure that the deformation region 19 does not press onto the hinge element 7 and restrict its freedom of motion. The annular region 49, measured in the radial direction, reaches beyond the flattened region 67. If the housing 3, in the receiving region 17 of the locking body 3, is pressed in the deformation region 19, then the region 67 of the hinge element 7 is not blocked by the deformation region 19 of the housing 3, though a twisting of the hinge element 7 in the recess 5 is prevented. At the same time, the front side 59 of the annular region 49 of the locking body 13 serves, as stated, as an axial stop for the deformation region 19. Here too, therefore, it is ensured that the hinge element 7 is held in the housing 3 such that it is secured against twisting and against excessive axial displacement.

All in all, a different realization of a spring hinge 1 is shown to be possible, which spring hinge comprises a locking body 13 having a receiving region 17 and a housing 3 having a deformation region 19. The locking body 13 can be differently realized, as can the associated receiving region 17, which can comprise one or more depressions or bores or, indeed, a recess which is situated between two guide arms 39 and 41. The deformation region has at least one wall region which is plastically deformable and can be displaced into the receiving region 17. In this way, it is easily possible, in particular without the use of any screws, to anchor the hinge element 7 inside the housing 3 by means of the locking body 13, the locking body 13 being secured both against twisting and against being pulled out of the recess 5 of the housing 3.

It becomes clear from the figures that the locking body 13 has at least one guide surface F1, which cooperates with a guide region 31 of the hinge element 7 such that, given anti-twist protection and axial fixation of the locking body 13, a twisting and an excessive axial displacement of the hinge element 7 are likewise prevented. In the illustrative embodiments which are here represented, it can be seen that the guide arms 39 and 41 have on their inner sides a respective guide surface F1 and F2, between which the guide region 31 of the hinge element 7 is disposed. The guide surfaces permit an axial displacement of the hinge element 7 over a certain path length. The axial securement of the locking body 13 inside the housing 3 and the supporting of the spring element 11 against the locking body 13 and against the brace 35 of the hinge element 7 serve, however, to prevent the hinge element 7 from being pulled out of the housing 3.

This ensures, therefore, that the hinge element 7 cannot be twisted relative to the housing 3 and cannot be pulled fully out of the recess 5. This simple construction proves its worth, in particular, in the increasing miniaturization of spring hinges 1, the position of the deformation region 19 being easily discernible, in particular, if the wall 47 of the housing 3 is provided with a region of thinner wall thickness, i.e. when a depression 63 is provided, for example, which shows the user where the deformation of the housing 3 must be effected in order to anchor the locking body 13 or the hinge element 7 securely in the housing 3.

Preferably, the wall region of the housing 3 in the deformation region 19 is of continuous configuration, so that the interior of the housing 3 is protected against the penetration of impurities. In principle, it is also possible, however, to realize the deformation region 19 by way of the rim of a hole made in the wall 47 of the housing 3.

From the illustrative embodiments which have here been represented and explained, it can be concluded that the deformation region 19 can be provided on the top side of the housing 3, but also on the bottom side thereof. It is additionally conceivable to provide a deformation region 19 in the region of at least one of the side walls of the housing 3. It also becomes plain that for a spring hinge a single deformation region may suffice, but that a plurality of deformation regions, where appropriate lying opposite one another in pairs, can also be realized.

In the final analysis, it is evident that the basic principle of the securement of the hinge element 7 against twisting and against being pulled out of the housing 3, which principle has here been pursued, can be realized both in spring hinges 1, the housing 3 of which is part of the side piece, and in spring hinges 1 which have a separate housing 3 applied to a spectacle side piece. Should the housing 3 be welded on, it can be provided with one or more weld bosses in the region of the bearing surface by which it rests on the side piece, which has been explained, by way of example, with reference to FIG. 19.

The invention claimed is:

1. A spring hinge for spectacles comprising:
   a center piece, side pieces fitted pivotally to the center piece;
   a housing having a recess therein;
   a spring element positioned within the recess of the housing and cooperating with the side pieces;
   a hinge element displaceably disposed within the recess of the housing; and
   a locking body disposed in the recess at a location to retain the hinge element in the recess, the locking body having a receiving region and the housing having a deformation region displaceable into the receiving region, wherein the receiving region and the deformation region are configured such that with the housing region displaced into the receiving region, the locking body and the hinge element are prevented from being twisted in the recess and from being pulled out of the recess.

2. The spring hinge as claimed in claim 1, wherein the deformation region is formed by at least one wall region of the housing which is plastically deformable by means of a tool.

3. The spring hinge as claimed in claim 2, wherein the wall region is closed.

4. The spring hinge as claimed in claim 2, wherein the wall region is formed by a rim of a hole made in the housing.

5. The spring hinge as claimed in claim 2, wherein the housing comprises a side wall and the plastically deformable wall region of the housing is thinner than the side wall of the housing.

6. The spring hinge as claimed in claim 2, wherein the tool comprises a mandrel.

7. The spring hinge as claimed in claim 1, wherein the deformation region comprises two plastically deformable wall regions of the housing.

8. The spring hinge as claimed in claim 1, wherein the receiving region has at least one cavity or flattening in the locking body.

9. The spring hinge as claimed in claim 1, wherein the receiving region has at least one cutout in the locking body, the cutout enclosing the deformation region on at least three sides.

10. The spring hinge as claimed in claim 1, wherein the locking body has two guide arms.

11. The spring hinge as claimed in claim 1, wherein the locking body has two running surfaces.

12. The spring hinge as claimed in claim 11, wherein the running surfaces of the locking body are mutually connectable by a material bridge.

13. The spring hinge as claimed in claim 1, wherein the locking body has at least one guide surface, which cooperates with the hinge element.

14. The spring hinge as claimed in claim 13, wherein the locking body has two mutually spaced guide surfaces, and wherein the hinge element is disposed between the two guide surfaces.

* * * * *

UNITED STATES PATENT AND TRADEMARK OFFICE
CERTIFICATE OF CORRECTION

PATENT NO. : 7,249,845 B2  Page 1 of 1
APPLICATION NO. : 10/539791
DATED : July 31, 2007
INVENTOR(S) : Jörg Fiehm It is certified that error appears in the above-identified patent and that said Letters Patent is hereby corrected as shown below:

Title page,
Item (75)   Inventors: should read -- Jörg Fiehn, Eisingen (DE) --

Signed and Sealed this

Sixth Day of November, 2007

JON W. DUDAS
*Director of the United States Patent and Trademark Office*